United States Patent
Häckel

(10) Patent No.: US 11,976,749 B2
(45) Date of Patent: May 7, 2024

(54) MULTILAYER MOTOR VEHICLE TEMPERATURE CONTROL TUBE

(71) Applicant: TI Automotive (Fuldabrück) GmbH, Fuldabrück (DE)

(72) Inventor: Andre Häckel, Waldeck (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 570 days.

(21) Appl. No.: 17/270,029

(22) PCT Filed: Aug. 20, 2019

(86) PCT No.: PCT/IB2019/057022
§ 371 (c)(1),
(2) Date: Feb. 21, 2021

(87) PCT Pub. No.: WO2020/039356
PCT Pub. Date: Feb. 27, 2020

(65) Prior Publication Data
US 2022/0268376 A1 Aug. 25, 2022

(30) Foreign Application Priority Data

Aug. 21, 2018 (EP) .................................... 18190072

(51) Int. Cl.
*F16L 11/04* (2006.01)
*B32B 1/08* (2006.01)
(Continued)

(52) U.S. Cl.
CPC .............. *F16L 11/045* (2013.01); *B32B 1/08* (2013.01); *B32B 27/08* (2013.01); *B32B 27/18* (2013.01);
(Continued)

(58) Field of Classification Search
CPC ........................................................ F16L 11/00
(Continued)

(56) References Cited

U.S. PATENT DOCUMENTS

| | | | | |
|---|---|---|---|---|
| 5,850,855 A | * | 12/1998 | Kerschbaumer | ........ F16L 11/15 138/121 |
| 6,068,026 A | * | 5/2000 | Garois | ...................... B32B 1/08 138/146 |

(Continued)

FOREIGN PATENT DOCUMENTS

| | | |
|---|---|---|
| CA | 2509518 A1 | 12/2005 |
| CN | 1425552 A | 6/2003 |

(Continued)

OTHER PUBLICATIONS

International Search Report and Written Opinion dated Nov. 18, 2019.

*Primary Examiner* — Patrick F Brinson
(74) *Attorney, Agent, or Firm* — Dickinson Wright PLLC

(57) ABSTRACT

Multilayer motor vehicle temperature control tube for fluid temperature control media, with the tube having at least three layers. Going from the outside to the inside, the layer structure comprises an outer layer of polyethylene or of a thermoplastic vulcanizate (TPV), an intermediate layer of polypropylene (PP) and an inner layer of polyethylene or of a thermoplastic vulcanizate (TPV). The total layer thickness of the tube is 0.7 to 2.5 mm.

19 Claims, 2 Drawing Sheets

(51) Int. Cl.
  *B32B 27/08* (2006.01)
  *B32B 27/18* (2006.01)
  *B32B 27/32* (2006.01)
  *B60H 1/00* (2006.01)
  *F16L 11/127* (2006.01)

(52) U.S. Cl.
  CPC .......... *B32B 27/32* (2013.01); *B32B 2250/03* (2013.01); *B32B 2250/242* (2013.01); *B32B 2307/202* (2013.01); *B32B 2307/732* (2013.01); *B32B 2597/00* (2013.01); *B60H 1/00571* (2013.01); *F16L 11/127* (2013.01)

(58) Field of Classification Search
  USPC ............... 138/137, 125, 140, 141; 428/36.91
  See application file for complete search history.

(56) References Cited

U.S. PATENT DOCUMENTS

2004/0040607 A1* 3/2004 Wilson .................. F16L 11/085
                                                                  138/140
  2005/0019517 A1   1/2005 Dabouineau
  2006/0083884 A1   4/2006 Cheng
  2007/0048475 A1*  3/2007 Haines .................. F16L 11/081
                                                                  428/36.91
  2008/0187701 A1   8/2008 Dabouineau
  2008/0236694 A1* 10/2008 Takagi .................. F16L 11/082
                                                                  285/369
  2008/0236695 A1* 10/2008 Takagi .................... F16L 11/12
                                                                  138/137
  2018/0038522 A1   2/2018 Sanni et al.

FOREIGN PATENT DOCUMENTS

CN       1721178 A    1/2006
  CN     104093557 A   10/2014
  JP     2001235068 A    8/2001
  JP     2003191358 A    7/2003
  JP     2006001280 A    1/2006
  JP     2006116966 A    5/2006
  JP     2008516814 A    5/2008

* cited by examiner

MULTILAYER MOTOR VEHICLE TEMPERATURE CONTROL TUBE

RELATED APPLICATIONS

The present patent document claims priority to PCT Application PCT/IB2019/057022, filed Aug. 20, 2019 which claims the benefit of and priority to European Patent Application 18190072.1, filed Aug. 21, 2018, and entitled "Multilayer Motor Vehicle Temperature Control Tube" the entire contents of which are incorporated herein by reference.

FIELD

The present disclosure relates to a multilayer motor vehicle tube or pipe, in particular a motor vehicle temperature control tube for fluid temperature control and cooling media. The tube according to the disclosure is thus preferably used as a temperature control tube, in particular as a cooling tube in motor vehicles, through which a temperature control medium is passed through the tube.—Such temperature control tubes are particularly used in temperature control circuits of motor vehicles. In this case, a temperature control medium—in particular a liquid temperature control medium—is passed through the temperature control tube. The temperature control tube is particularly preferably configured as a cooling tube, whereby a coolant of a coolant circulation system of the motor vehicle is passed through the cooling tubes. One area of application of the temperature control tubes according to the disclosure is its use in temperature control systems of electric vehicles or hybrid motor vehicles with an electric motor and an internal combustion engine. The temperature control tube according to the disclosure—in particular the cooling tube—is furthermore preferably used for controlling the temperature or cooling the battery systems of motor vehicles.

BACKGROUND

Temperature control tubes or cooling tubes of various embodiments are known from practice and in particular for controlling the temperature or cooling motor vehicle components. However, the previously known tubes often leave something to be desired regarding their barrier properties with respect to the temperature control medium and/or regarding their thermal insulation. If such tubes are produced with satisfactory barrier properties and with adequate thermal insulation as well, this is usually associated with high effort and/or at high materials expenditures and thus high costs. Many of the multi-layer temperature control tubes known from practice are furthermore not sufficiently mechanically resistant, although mechanical resistance is important and desirable, especially in motor vehicle tubes.

SUMMARY

In contrast, the disclosure is based on the technical problem of disclosing a motor vehicle temperature control tube or pipe or pipeline, which satisfies all requirements with regard to its barrier properties as well as in terms of its thermal insulation and also with respect to its mechanical properties, and can nonetheless be produced with little effort and at low cost.

To solve this technical problem, the disclosure discloses a multi-layer motor vehicle temperature control tube for fluid temperature control media—in particular for fluid cooling media—with the tube having at least three layers, with the following layer structure from the outside to the inside:

an outer layer of polyethylene or of a thermoplastic vulcanizate (TPV),
an interlayer of polypropylene (PP),
an inner layer of polyethylene or of a thermoplastic vulcanizate (TPV), wherein the total layer thickness of the tube is 0.5 to 3.0 mm, in particular 0.7 to 2.5 mm, preferably 0.75 to 2.2 mm, more preferably 0.8 to 2 mm, very preferably 0.85 to 1, 8 mm and particularly preferably 0.85 to 1.6 mm. This total layer thickness of the tube has proven to be particularly advantageous with regard to the solution of the technical problem and in particular with regard to achieving the various advantages.

The disclosure relates to the use of a motor vehicle tube as a temperature control tube—in particular as a cooling line—in motor vehicles. This involves passing a fluid temperature control medium—in particular a fluid cooling medium—and preferably a liquid temperature control medium—in particular a liquid cooling medium—through the tube. The motor vehicle temperature control tube according to the disclosure can be used for controlling the temperature of conventional motor vehicles with an internal combustion engine. According to a particular embodiment of the disclosure, the motor vehicle temperature control tube of the disclosure is used in temperature control systems of electric vehicles or in the temperature control system of hybrid motor vehicles with an electric motor and an internal combustion engine.—According to a recommended embodiment of the disclosure, the motor vehicle temperature control tube of this disclosure is used for controlling the temperature or for cooling the battery of a motor vehicle via a temperature control system. It is also within the scope of the disclosure that the motor vehicle temperature control tube according to the disclosure is used as a temperature control tube or cooling tube in an air conditioning system of a motor vehicle. The tube can, above all, also be used for cooling motor vehicle batteries in electric motor vehicles or in hybrid motor vehicles.

According to a particularly recommended embodiment of the disclosure, a liquid medium is used as the temperature control medium or as the cooling medium. A mixture of liquids and in particular an alcohol-water mixture, preferably a glycol-water mixture can be used for this purpose. In principle, however, other temperature control media or cooling media are possible within the scope of the disclosure.

An outer layer of polyethylene or of a thermoplastic vulcanizate (TPV) is used according to the disclosure. It is within the scope of the disclosure that the outer layer consists essentially of polyethylene or substantially of a thermoplastic vulcanizate (TPV). The outer layer can in particular have additives or conventional additives in addition to the aforesaid plastic. The outer layer expediently consists of at least 90 wt.-%, preferably at least 93 wt.-%, more preferably at least 96 wt.-% and very preferably at least 98 wt.-% polyethylene or a thermoplastic vulcanizate (TPV).

A highly recommended embodiment of the disclosure is characterized in that HDPE (High Density Polyethylene) is used as the polyethylene for the outer layer. The use of polyethylene and HDPE, in particular for the outer layer, is of particular importance in the scope of the disclosure. This provides considerable advantages in terms of solving the technical problem.—According to another recommended embodiment, a mixture and/or an alloy of an elastomer and a polyolefin—in particular polypropylene (PP)—is used as a thermoplastic vulcanizate (TPV) for the outer layer. The elastomer is preferably EPDM (ethylene-propylene-diene rubber).

The thickness of the outer layer is advantageously 10 to 50%, preferably 10 to 45%, more preferably 10 to 40% and very preferably 15 to 40% of the total layer thickness or the total wall thickness of the tube. In principle, it is within the scope of the disclosure for the temperature control tube according to the disclosure to also have at least one outermost layer adjacent to the outer layer.

According to the disclosure, an intermediate layer of polypropylene (PP) is provided between the outer layer and the inner layer. It is within the scope of the disclosure for the intermediate layer to essentially consist of polypropylene (PP). The intermediate layer may also have additives or customary additives in addition to PP. It is recommended for the intermediate layer to consist of at least 90 wt.-%, preferably at least 92 wt.-%, more preferably at least 95 wt.-% and very preferably at least 98 wt.-% polypropylene (PP).—The thickness of the intermediate layer is advantageously 10 to 45%, preferably 10 to 40%, more preferably 15 to 40% and very preferably 15 to 35% of the total layer thickness or the total wall thickness of the tube.

According to the disclosure, the multi-layer motor vehicle temperature control tube has an inner layer of polyethylene or of a thermoplastic vulcanizate (TPV). It is within the scope of the disclosure for the inner layer to essentially consist of polyethylene or primarily of a thermoplastic vulcanizate. The inner layer may in particular also have additives or conventional additives in addition to the said plastic. The inner layer expediently consists of at least 90 wt.-%, preferably at least 92 wt.-%, more preferably at least 95 wt.-% and very preferably at least 98 wt.-% polyethylene or a thermoplastic vulcanizate (TPV). Polyethylene HDPE is preferably used for the inner layer. Polyethylene and/or HDPE has proven particularly useful for the inner layer of the tube according to the disclosure and considerable advantages are achieved thereby with regard to the solution of the aforesaid technical problem.—According to another recommended embodiment of the disclosure, an inner layer of a thermoplastic vulcanizate (TPV) is used for the motor vehicle temperature control tube according to the disclosure. The thermoplastic vulcanizate of the inner layer is preferably a mixture or an alloy of an elastomer and a polyolefin, in particular polypropylene (PP). The elastomer is expediently EPDM (ethylene-propylene-diene rubber).

A recommended embodiment of the disclosure is characterized in that the thickness of the inner layer is 10 to 50%, preferably 10 to 45%, more preferably 10 to 40% and particularly preferably 15 to 40% of the total wall thickness or total layer thickness of the tube. According to one embodiment of the disclosure, the thickness of the inner layer is 10 to 35%, in particular 10 to 30% of the total layer thickness or total wall thickness of the tube.

It is within the scope of the disclosure for the tube according to the disclosure to comprise the "outer layer—intermediate layer—inner layer" layer aggregate and otherwise optionally at least only one—preferably one—outermost layer adjacent to the outer layer and/or at least one—in particular one—innermost layer adjacent to the inner layer. One embodiment of the disclosure is characterized in that the motor vehicle temperature control tube according to the disclosure has only the "outer layer—intermediate layer—inner layer" layer aggregate, in particular without further interposed layers and without adjacent outside and/or inside layers.

According to a recommended embodiment of the disclosure, at least one, preferably one, first adhesion promoting layer is interposed between the outer layer and the intermediate layer. The thickness of the first adhesion promoting layer is advantageously 2 to 25%, preferably 3 to 20%, more preferably 5 to 20% and very preferably 5 to 15% of the total layer thickness or the total wall thickness of the tube. An embodiment of the disclosure is characterized in that the thickness of the first adhesion promoting layer is 20 to 70%, preferably 25 to 70% and particularly preferably 25 to 65% of the thickness of the outer layer.

It is within the scope of the disclosure for at least one—preferably one—second adhesion promoting layer to be interposed between the intermediate layer and the inner layer. According to a preferred embodiment of the disclosure, the thickness of the second adhesion promoting layer is 2 to 25%, advantageously 3 to 20% and preferably 5 to 15% of the total layer thickness or the total wall thickness of the tube. An alternative embodiment is characterized in that the thickness of the second adhesion promoting layer is 20 to 60%, advantageously 20 to 55% and preferably 25 to 55% of the thickness of the intermediate layer. According to a proven embodiment of the disclosure, the thickness of the second adhesion promoting layer is 25 to 70%, preferably 25 to 65% of the thickness of the outer layer.

A highly recommended embodiment of the disclosure is characterized in that the first adhesion promoting layer and/or the second adhesion promoting layer is an adhesion promoting layer based on at least one polyolefin, in particular based on polyethylene. The first adhesion promoting layer and/or the second adhesion promoting layer is provably an adhesion promoting layer based on a polyolefin—in particular polyethylene—modified with at least one carboxylic acid derivative—preferably a maleic acid derivative.

It is within the scope of the disclosure for the tube to comprise the "outer layer—first adhesion promoting layer—intermediate layer—second adhesion promoting layer—inner layer" aggregate without the interposition of further layers and optionally only at least one outermost layer adjacent to the outer layer and/or at least one innermost layer adjacent to the inner layer. According to one embodiment of the disclosure, the tube according to the disclosure consists only of the "outer layer—first primer layer—intermediate layer—second primer layer—inner layer" aggregate, in particular without the interposition of further layers and without further adjacent outermost and/or innermost layers.

According to a preferred embodiment of the disclosure, the inner layer is thicker than the first adhesion promoting layer and/or thicker than the second adhesion promoting layer. The inner layer is advantageously at least 1.2 times, preferably at least 1.5 times and very preferably at least 2 times thicker than the first adhesion promoting layer and/or the second adhesion promoting layer.—It is furthermore within the scope of the disclosure for the intermediate layer to be thicker than the first adhesion promoting layer and/or thicker than the second adhesion promoting layer. The intermediate layer is advantageously at least 1.2 times, preferably at least 1.5 times and very preferably at least 2 times thicker than the first adhesion promoting layer and/or the second adhesion promoting layer. The outer layer is preferably thicker than the first adhesion promoting layer and/or thicker than the second adhesion promoting layer. It is within the scope of the disclosure for the outer layer to be at least 1.2 times, preferably at least 1.5 times and very preferably at least 2 times thicker than the first adhesion promoting layer and/or the second adhesion promoting layer.—According to one alternative embodiment of the disclosure, the first adhesion promoting layer and the second adhesion promoting layer have the same thickness or approximately the same thickness. The thickness of the first adhesion promoting layer preferably differs from the thickness of the second adhesion promoting layer by a maximum of 20% or advantageously by a maximum of 15% and preferably by a maximum of 10%.

It is within the scope of the disclosure that the motor vehicle temperature control tube according to the disclosure is produced by extrusion or coextrusion of the layers. The disclosure is based on the realization that the materials used for the individual layers and also the preferred layer thicknesses of the individual layers allow for a very simple and energy-saving coextrusion. It is particularly advantageous that the extrusion of the tube according to the disclosure can be performed at moderate temperatures.

The disclosure will be explained below in greater detail with reference to an exemplary embodiment: According to a preferred embodiment, the multi-layer motor vehicle temperature control tube has an outer layer of HDPE, an intermediate layer of polypropylene and an inner layer of HDPE. An adhesion promoting layer is preferably interposed between the outer layer and the intermediate layer as well as between the intermediate layer and the inner layer respectively. In this exemplary embodiment, the thickness of the outer layer is expediently 15 to 45% of the total layer thickness or total wall thickness of the tube, and the thickness of the intermediate layer is preferably 10 to 40% of the total layer thickness or the total wall thickness of the tube. It is furthermore recommended and a feature of this exemplary embodiment that the thickness of the inner layer is 15 to 45% of the total layer thickness or total wall thickness of the tube. The thickness of the first adhesion promoting layer and the thickness of the second adhesion promoting layer in the exemplary embodiment are preferably 2 to 20% of the total layer thickness or total wall thickness of the tube. In doing so, the thickness of the first adhesion promoting layer and the second adhesion promoting layer is expediently 20 to 65% of the thickness of the outer layer. According to a preferred embodiment of the disclosure and in the exemplary embodiment, the first adhesion promoting layer and the second adhesion promoting layer are adhesion promoting layers based on a polyolefin, in particular based on polyethylene.

According to one embodiment of the disclosure, at least one outermost layer made of a polyolefin, in particular polypropylene, adjoins the outside layer of the tube on the outside. A particularly preferred embodiment is characterized in that a layer aggregate with layers of polyolefins— preferably exclusively with layers of polyolefins—borders on the outside of the outer layer. In this case, this layer aggregate preferably has an alternating layer sequence with alternating layers of polypropylene and HDPE. This layer aggregate thus has the alternating layer sequence PP/HDPE/PP.

The disclosure is based on the realization that the multi-layer motor vehicle temperature control tube according to the disclosure is characterized by excellent barrier properties with respect to the temperature control media, in particular with respect to alcohol-water mixtures and, in particular, glycol-water mixtures. The temperature control tube according to the disclosure additionally also has excellent thermal insulating properties. The mechanical properties are furthermore satisfactory and/or the mechanical resistance meets all requirements. Above all, the temperature control tube according to the disclosure, with its layer composite, exhibits optimal mechanical strength. It is a further advantage of the temperature control tube according to the disclosure that unwanted creeping properties of the HDPE in the layer composite according to the disclosure can be avoided. Surprisingly tight and firm connections of the tube according to the disclosure to connectors and other components can be realized. This can be achieved due to the layer composite according to the disclosure. It should also be emphasized that the temperature control tube according to the disclosure can be implemented by means of relatively simple and inexpensive actions. The coextrusion of the layer composite can be performed in a problem-free, effective and energy-saving manner and the layer composite according to the disclosure is characterized by having a simple and variable thermal and mechanical processability. The production of the tube requires a relatively small amount of material as compared to the advantages gained. The cost of producing the temperature control tube according to the disclosure is thus relatively low. The tubes according to the disclosure are above all less expensive than comparable tubes with polyamide or polyamide 12 layers.

BRIEF DESCRIPTION OF THE DRAWINGS

The disclosure will hereinafter be explained in greater detail with reference to a drawing showing only one exemplary embodiment. A schematic representation shows.

DETAILED DESCRIPTION

Figure 1:
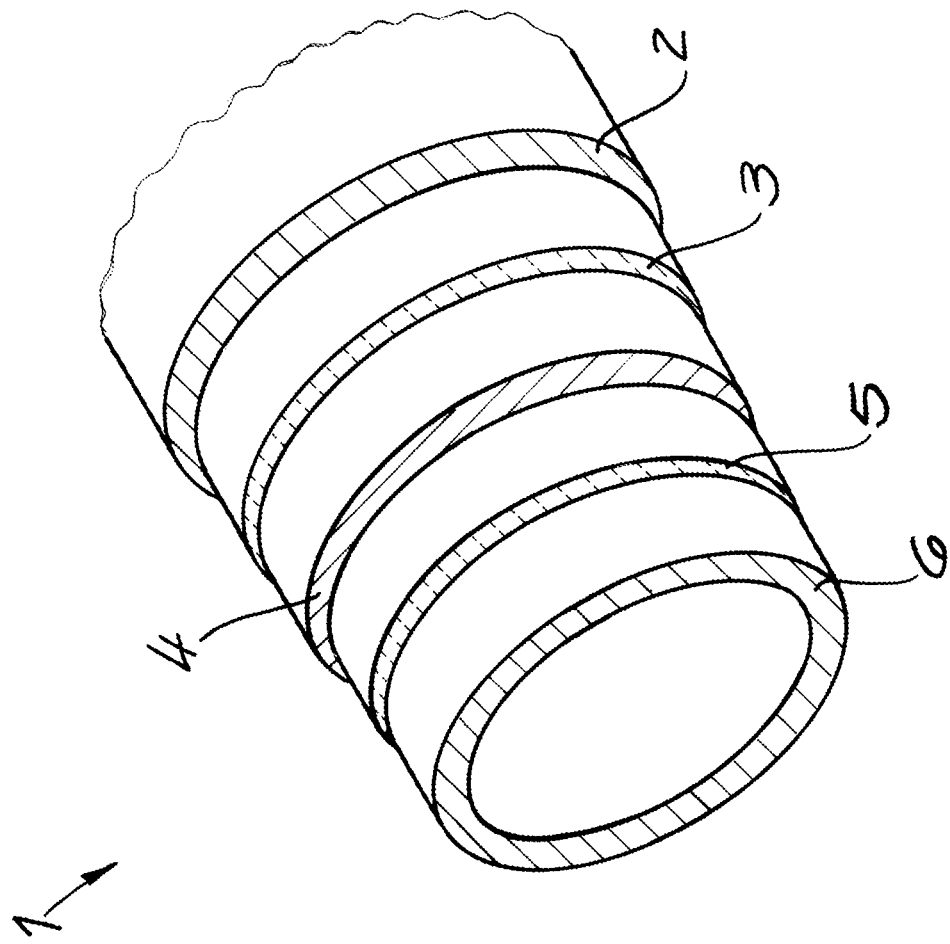
FIG. 1 a perspective view of a motor vehicle temperature control tube according to the disclosure and
FIG. 2 a section through the object of FIG. 1.
Figure 2:
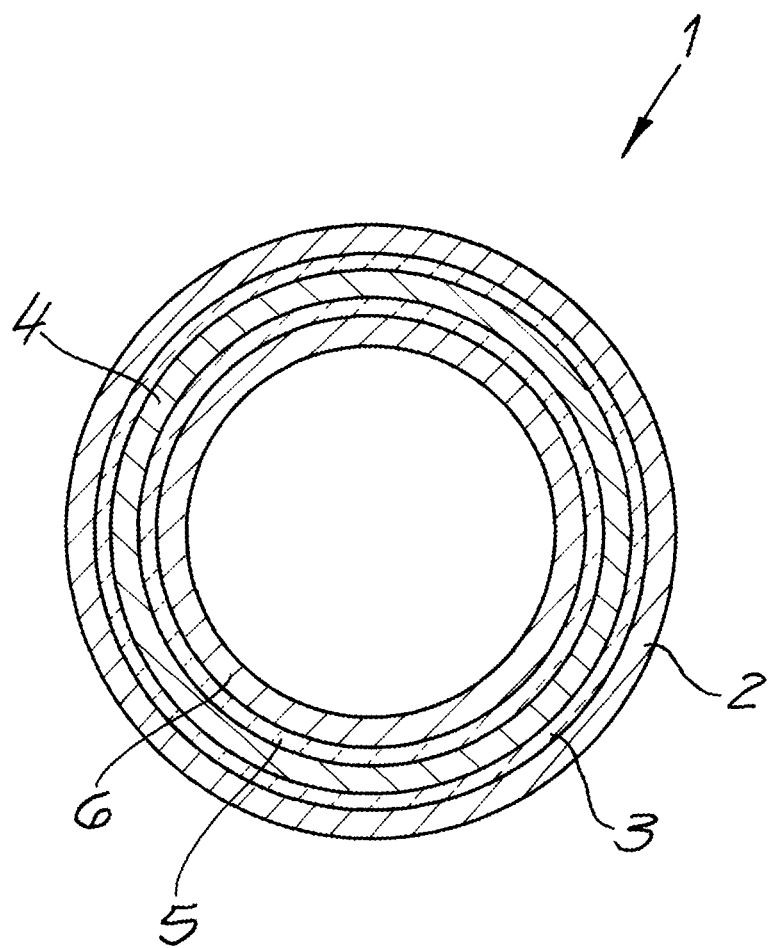

The figures show a motor vehicle temperature control tube 1 according to the disclosure. In the case of this tube 1, the exemplary embodiment may be a cooling tube 1 for motor vehicles. The cooling medium not shown in the figures is passed through the tube 1. The cooling medium is preferably an alcohol-water mixture and in particular a glycol-water mixture.—The tube 1 expediently has five layers in the exemplary embodiment. Going from the outside to the inside, these comprise an outer layer 2, a first adhesion promoting layer 3, an intermediate layer 4, a second adhesion promoting layer 5 and an inner layer 6. According to one embodiment, the inner layer 6 may have conductive additives, so that it is designed to be electrically conductive.

An outer layer 2 of polyethylene, preferably of HDPE, is used according to a particularly preferred embodiment and in the exemplary embodiment. The first adhesion promoting layer 3 in the exemplary embodiment is advantageously an adhesion promoting layer based on a polyolefin, in particular based on polyethylene. This is preferably a modified polyolefin and most preferably a modified polyethylene.

An intermediate layer 4 of polypropylene (PP) is present according to the disclosure. This intermediate layer 4 advantageously consists essentially of polypropylene and may additionally contain additives. The intermediate layer in the exemplary embodiment preferably consists of at least 95 wt.-% polypropylene. An inner layer 6 of polyethylene, preferably made of HDPE, is furthermore provided. This second adhesion promoting layer 5 in the exemplary embodiment is, as recommended, based on a polyolefin, in particular based on polyethylene. It is preferably a modified polyolefin, in particular a modified polyethylene.

The total layer thickness or the total wall thickness of the tube 1 is expediently 0.8 to 2 mm and preferably 0.9 to 1.6 mm. The outer layer 2 and the intermediate layer 4 and the inner layer 6 in the embodiment are, as recommended, each thicker than the first adhesion promoting layer 3 and each thicker than the second adhesion promoting layer 5. The outer layer 2 and/or the intermediate layer 4 and/or the inner layer 6 is advantageously at least 1.2 times, preferably at least 1.5 times and very preferably at least 1.8 times thicker than the first adhesion promoting layer 3 and/or the second adhesion promoting layer 5.

An outer layer 2 and/or an inner layer 6 of a thermoplastic vulcanizate (TPV) is used according to a further embodiment of the disclosure. The thermoplastic vulcanizate is preferably an alloy or a mixture of an elastomer and a polyolefin, preferably polypropylene (PP). In this case, the elastomer is preferably EPDM (ethylene-propylene-diene rubber).

The invention claimed is:

1. Multilayer motor vehicle tube, in particular a motor vehicle temperature control tube for fluid temperature control and cooling media, wherein the tube has at least three layers, namely with the following layer structure as listed in going from the outside to the inside:
   an outer layer being at least 98% by weight of high density polyethylene (HDPE) or of a thermoplastic vulcanizate (TPV),
   an intermediate layer of polypropylene (PP),
   an inner layer of polyethylene or of a thermoplastic vulcanizate (TPV),
wherein the total layer thickness or the total wall thickness of the tube is 0.5 to 3.0 mm;
   wherein the outer layer and/or the inner layer is HDPE.

2. The tube according to claim 1, wherein the thermoplastic vulcanizate (TPV) for the outer layer and/or for the inner layer is a mixture or an alloy of an elastomer and a polyolefin—in particular polypropylene (PP).

3. The tube according to claim 2, wherein the elastomer is EPDM (ethylene-propylene-diene rubber).

4. The tube according to claim 1, wherein the thickness of the outer layer is 10 to 50% of the total wall thickness of the tube.

5. The tube according to claim 1, wherein the thickness of the intermediate layer is 10 to 45% wall thickness of the tube.

6. The tube according to claim 1, wherein the thickness of the inner layer is 10 to 50% of the total wall thickness of the tube.

7. The tube according to claim 1, wherein the tube has the "outer layer-intermediate layer-inner layer" layer aggregate and only at least one outermost layer adjoining the outer layer and/or at least one innermost layer adjoining the inner layer.

8. The tube according to claim 1, wherein at least one first adhesion promoting layer is interposed between the outer layer and the intermediate layer.

9. The tube according to claim 8, wherein the thickness of the first adhesion promoting layer is 2 to 25% of the total wall thickness of the tube.

10. The tube according to claim 8, wherein the thickness of the first adhesion promoting layer is 25 to 70% of the thickness of the outer layer.

11. The tube according to claim 1, wherein at least one second adhesion promoting layer is interposed between the intermediate layer and the inner layer.

12. The tube according to claim 11, wherein the thickness of the second adhesion promoting layer is 2 to 25% of the total wall thickness of the tube.

13. The tube according to claim 11, wherein the thickness of the second adhesion promoting layer is 20 to 60%, of the thickness of the intermediate layer.

14. The tube according to claim 8, wherein the first adhesion promoting layer and/or the second adhesion promoting layer is an adhesion promoting layer based on a polyolefin.

15. The tube according to claim 14, wherein the first adhesion promoting layer and/or the second adhesion promoting layer is an adhesion promoting layer based on polyethylene—modified with at least one carboxylic acid derivative.

16. The tube according to claim 1, wherein the tube has the layer aggregate of "outer layer-first adhesion promoting layer-intermediate layer-second adhesion promoting layer-inner layer" and only at least one outermost layer adjacent to the outer layer and/or at least one innermost layer adjacent to the inner layer.

17. The tube according to claim 1, wherein at least one further layer of a polyolefin adjoins the outside of the outer layer.

18. The tube according to claim 17, wherein an aggregate of polyolefin layers adjoins the outside of the outer layer.

19. The tube according to claim 4, wherein the thickness of the outer layer is 15 to 40% of the total wall thickness of the tube.

* * * * *